United States Patent [19]

Mizukuchi

[11] 4,390,467
[45] Jun. 28, 1983

[54] LIQUID CRYSTAL COMPOSITIONS

[75] Inventor: Yutaka Mizukuchi, Tokorozawa, Japan

[73] Assignee: Citizen Watch Co., Ltd., Tokyo, Japan

[21] Appl. No.: 351,433

[22] Filed: Feb. 23, 1982

[30] Foreign Application Priority Data

Apr. 30, 1981 [JP] Japan .................................. 56-65616

[51] Int. Cl.³ .......................... C09K 3/34; C02F 1/13
[52] U.S. Cl. .......................... 252/299.63; 252/299.65; 350/350 R
[58] Field of Search ...................... 252/299.63, 299.65, 252/299.67; 350/350 R

[56] References Cited

U.S. PATENT DOCUMENTS

| | | | |
|---|---|---|---|
| 4,065,489 | 12/1977 | Steinstrasser et al. | 252/299.65 |
| 4,073,742 | 2/1978 | Erdmann et al. | 252/299.65 |
| 4,138,359 | 2/1979 | Mizukuchi | 252/299.65 |
| 4,216,109 | 8/1980 | Mizukuchi | 252/299.65 |
| 4,229,315 | 10/1980 | Krause et al. | 252/299.63 |
| 4,290,905 | 9/1981 | Kanbe | 252/299.63 |

FOREIGN PATENT DOCUMENTS

| | | | |
|---|---|---|---|
| 19665 | 12/1980 | European Pat. Off. | 252/299.63 |
| 23728 | 2/1981 | European Pat. Off. | 252/299.63 |
| 55-21429 | 2/1980 | Japan | 252/299.65 |
| 55-29545 | 3/1980 | Japan | 252/299.64 |
| 56-98278 | 8/1981 | Japan | 252/299.63 |

OTHER PUBLICATIONS

Levine, A. et al., Mol. Cryst. Liq. Cryst., vol. 43, pp. 183-187, (1977).

Primary Examiner—Teddy S. Gron
Attorney, Agent, or Firm—Koda and Androlia

[57] ABSTRACT

A liquid crystal composition comprises at least two compounds selected from the group consisting of trans-4-alkylcyclohexane-1-carboxylic acid-4'-(4''-alkylphenyl)-2'-chlorophenyl ester having the general formula:

wherein R and R' are normal chain alkyl groups containing 2 to 7 carbon atoms, these compounds making up 30 mole % or more of the total composition, and at least one compound selected from at least one of the group consisting of 4-alkylbenzoic acid-4'-(4''-alkylphenyl)-2'-chlorophenyl ester having the general formula:

wherein R and R' are normal chain alkyl groups containing 2 to 8 carbon atoms and the group consisting of 4-alkoxybonzoic acid-4'-(4''-alkylphenyl)-2'-chlorophenyl ester having the general formula:

wherein R and R' are normal chain alkyl groups containing 2 to 8 carbon atoms. This composition not only have a wide nematic temperature range assuring operation at a low temperature of less than −20° C. but also have a low viscosity and excellent response.

9 Claims, No Drawings

LIQUID CRYSTAL COMPOSITIONS

BACKGROUND OF THE INVENTION

The present invention relates to liquid crystal compositions and more particularly to liquid crystal compositions which can be used over a wide range of temperatures.

The usefulness of liquid crystal display devices has attracted attention from many fields and the devices have been intended for a wide variety of applications. As a result, it is necessary to prepare liquid crystals having the properties which satisfy the necessary conditions of application.

For example, a panel display using liquid crystals for cars requires a nematic liquid crystalline temperature range (nematic range) of $-40°$ C. to $100°$ C. To meet this requirement, a plurality of liquid crystal compounds have been mixed in the past. The properties of these liquid crystal mixtures and the methods of making them are described in the patent literature such as U.S. Pat. Nos. 4,216,109 and 4,290,905. Unfortunately, as is apparent from the above prior patent literature, liquid crystal compositions having a wide nematic range have not yet been obtained. Especially at low temperatures, they are not operable.

SUMMARY OF THE INVENTION

It is an object of the invention to provide a liquid crystal composition having a wide temperature range, particularly having an enlarged low temperature range.

It is another object of the invention to provide a liquid crystal composition having a low viscosity and good response besides the above features.

According to the present invention, the liquid crystal composition achieving the aforementioned objects comprises at least two compounds selected from the group consisting of trans-4-alkylcyclohexane-1-carboxylic acid-4'-(4"-alkylphenyl)-2'-chlorophenyl ester having the general formula:

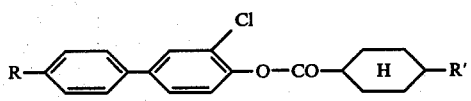

wherein R and R' are normal chain alkyl groups containing 2 to 7 carbon atoms, these compounds making up 30 mole % or more of the total composition, and at least one compound selected from at least one of the group consisting of 4-alkylbenzoic acid-4'-(4"-alkylphenyl)-2'-chlorophenyl ester having the general formula:

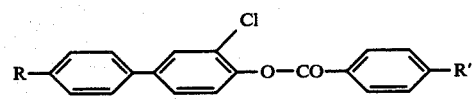

wherein R and R' are normal chain alkyl groups containing 2 to 8 carbon atoms and the group consisting of 4-alkoxybonzoic acid-4'-(4"-alkylphenyl)-2'-chlorophenyl ester having the general formula:

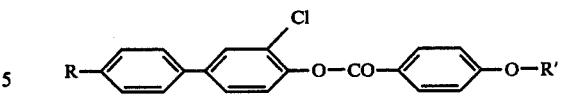

wherein R and R' are normal chain alkyl groups containing 2 to 8 carbon atoms. This composition permits a wide range of temperatures especially excellent in a low temperature range and a low viscosity as well as good response.

Now, the invention will be explained through the use of embodiments.

DESCRIPTION OF THE PREFERRED EMBODIMENTS

The liquid crystal compounds of the present invention are classified into groups I to III (see Tables 1 to 3), that is, the group I consisting of trans-4-alkylcyclohexane-1-carboxylic acid-4'-(4"-alkylphenyl)-2'-chlorophenyl ester having the general formula

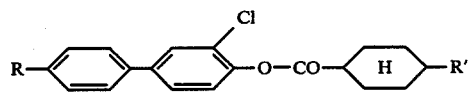

wherein R and R' are normal chain alkyl groups containing 2 to 7 carbon atoms, the group II consisting of 4-alkylbenzoic acid-4'-(4"-alkylphenyl)-2'-chlorophenyl ester having the general formula:

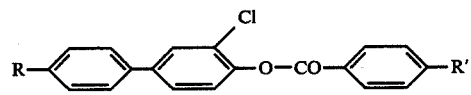

wherein R and R' are normal chain alkyl groups containing 2 to 8 carbon atoms, and the group III consisting of 4-alkoxybenzoic acid-4'-(4"-alkylphenyl)-2-chlorophenyl ester having the general formula:

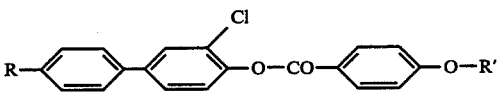

wherein R and R' are normal chain alkyl groups containing 2 to 8 carbon atoms. Each of the compounds was obtained as follows: In the presence of alkali such as pyridine, 4-(4'-alkylphenyl)-2-chlorophenol and carboxylic acid chloride were combined to esterification. By dissolving the resulting product into a solvent such as petroleum ether, recrystallization was repeated to effect purification. The method of synthesizing these compounds is fundamentally the same as those disclosed in detail in U.S. Pat. Nos. 4,216,109 and 4,290,905.

The nematic ranges of these compounds are given in Tables 1 to 3.

TABLE 1
Nematic Ranges of Group I Compounds (°C.)

R—⟨C₆H₄⟩—⟨C₆H₃Cl⟩—O—CO—⟨C₆H₁₀⟩—R'

| R | R' = C₂H₅ | C₃H₇ | C₄H₉ | C₅H₁₁ | C₆H₁₃ | C₇H₁₅ |
|---|---|---|---|---|---|---|
| C₂H₅ | | | | (1) 73 ~ 145 | | |
| C₃H₇ | | (2) 67 ~ 158 | (3) 61 ~ 154 | (4) 70 ~ 157 | | |
| C₄H₉ | | (5) 43 ~ 145 | (6) 60 ~ 131 | (7) 62 ~ 145 | (12) 56 ~ 136 | |
| C₅H₁₁ | (8) 54 ~ 114 | (9) 53 ~ 145 | (10) 50 ~ 141 | (11) 74 ~ 146 | (13) 48 ~ 140 | (14) 61 ~ 144 |
| C₆H₁₃ | (15) 34 ~ 108 | (16) 44 ~ 136 | (17) 38 ~ 133 | (18) 33 ~ 139 | (19) 50 ~ 130 | (20) 49 ~ 134 |
| C₇H₁₅ | | (21) 51 ~ 136 | (22) 43 ~ 135 | (23) 55 ~ 134 | (24) 47 ~ 128 | |

TABLE 2
Nematic Ranges of Group II Compounds (°C.)

R—⟨C₆H₄⟩—⟨C₆H₃Cl⟩—O—CO—⟨C₆H₄⟩—R'

| R | C₂H₅ | C₃H₇ | C₄H₉ | C₅H₁₁ | C₆H₁₃ | C₇H₁₅ | C₈H₁₇ |
|---|---|---|---|---|---|---|---|
| C₂H₅ | | | | | (1) 41 ~ 89 | | |
| C₃H₇ | | (2) 86 ~ 121 | (3) 59 ~ 110 | (4) 49 ~ 113 | (5) 44 ~ 103 | | |
| C₄H₉ | | (6) 63 ~ 101 | (7) 31 ~ 92 | (8) 37 ~ 100 | (9) 29 ~ 88 | | |
| C₅H₁₁ | (10) 69 ~ 102 | (11) 51 ~ 113 | (12) 48 ~ 105 | (13) 26 ~ 104 | (14) 45 ~ 99 | (15) 57 ~ 103 | (16) 48 ~ 94 |
| C₆H₁₃ | | (17) 50 ~ 89 | (18) 50 ~ 89 | (19) 38 ~ 95 | (20) 30 ~ 88 | (21) 47 ~ 89 | (22) 46 ~ 89 |
| C₇H₁₅ | | | (23) 29 ~ 91 | (24) 28 ~ 98 | (25) 23 ~ 93 | (26) 29 ~ 79 | (27) 30 ~ 93 |
| C₈H₁₇ | | | (28) 45 ~ 86 | | (29) 35 ~ 86 | (30) 29 ~ 91 | |

TABLE 3
Nematic Ranges of Group III Compounds (°C.)

R—⟨C₆H₄⟩—⟨C₆H₃Cl⟩—O—CO—⟨C₆H₄⟩—OR'

| R | C₂H₅ | C₃H₇ | C₄H₉ | C₅H₁₁ | C₆H₁₃ | C₇H₁₅ | C₈H₁₇ |
|---|---|---|---|---|---|---|---|
| C₂H₅ | | | | | | | |
| C₃H₇ | | (1) | (2) | (3) | (4) | | |
| | | 94 ~ 157 | 65 ~ 145 | 64 ~ 140 | 80 ~ 140 | | |
| C₄H₉ | (5) 99 ~ 133 | (6) 46 ~ 137 | (7) 48 ~ 127 | (8) 62 ~ 127 | | | |
| C₅H₁₁ | (9) 65 ~ 141 | (10) 57 ~ 145 | (11) 56 ~ 135 | (12) 61 ~ 136 | | | |
| C₆H₁₃ | | | (13) 58 ~ 130 | (14) 52 ~ 122 | (15) 46 ~ 125 | | (16) 61 ~ 118 |
| C₇H₁₅ | | | (17) 53 ~ 133 | (18) 46 ~ 123 | (19) 63 ~ 127 | | |
| C₈H₁₇ | | | | | (20) 53 ~ 116 | (21) 55 ~ 116 | (22) 54 ~ 115 |

In each table, the lower limit of nematic range represents the temperature at which the crystal turns into a nematic phase (CN point), while the upper limit represents the temperature at which the nematic phase turns into an isotropic phase (NI point). The numerals in parentheses indicate compound numbers for each group.

As shown in Tables 1 to 3, each compound shows a relatively wide nematic range and is especially excellent in high-temperature properties. At low temperatures, however, these compounds do not exhibit the properties of liquid crystals. Therefore, it is necessary to lower the CN point by mixing some liquid crystal materials.

In studying of the transition temperature of mixed liquid crystals, the Schroeder-Vanlaar equation is used as a good guide (from 'Mol. Cryst. Liq. Cryst., 1977 Vol. 43, pp. 183-187' ©Gordon and Breach Science Publishers, Ltd., 1977 Printed in Holland):

$$-l_n x_1 = \frac{\Delta H_1}{R}\left(\frac{1}{T_0} - \frac{1}{T_1}\right),$$

$$-l_n x_2 = \frac{\Delta H_2}{R}\left(\frac{1}{T_0} - \frac{1}{T_2}\right),$$

$$\ldots$$

$$-l_n x_i = \frac{\Delta H_i}{R}\left(\frac{1}{T_0} - \frac{1}{T_i}\right)$$

$$x_1 + x_2 + \ldots x_i = 1$$

wherein $x_1, x_2 \ldots x_i$ are the mole fractions of components 1, 2 ... i, R is a gas constant, $\Delta H_1, \Delta H_2 \ldots$ and $\Delta H_i$ represent the heat of fusion required when each component is converted from crystal to nematic phase, $T_1, T_2 \ldots T_i$ are the CN point temperatures of each component (absolute temperatures), and $T_0$ is the CN point temperature of the eutectic mixture.

Also, the NI point temperature of a mixture, $T_{NI}$, is given by:

$$T_{NI} = x_1 T_{1NI} + x_2 T_{2NI} + \ldots + x_i T_{iNI}$$

wherein $x_1, x_2 \ldots x_i$ are the mole fractions of each component, and $T_{iNI}$ is the NI point of component i.

The measurements of $\Delta H$, $T_{iCN}$ and $T_{iNI}$ for each compound permit not only estimating the CN and NI points of its mixture by the use of the above formula but also assuming a mixing composition ratio that provides a desired temperature.

Table 4 shows the measurement result of the heat of fusion ($\Delta H$) of each compound included in the aforementioned groups I to III.

TABLE 4
Heat of Fusion [$\Delta H$ (kcal/mole)] of Each Compound in Groups I to III at CN Point

| Group I compound | | | Group II compound | | | Group III compound | | |
|---|---|---|---|---|---|---|---|---|
| No. | | No. | No. | | No. | No. | | No. |
| 1 | 6.1 | 16  8.1 | 1 | 4.2 | 16  5.7 | 1 | 6.2 | 16  6.2 |
| 2 | 6.9 | 17  7.7 | 2 | 6.2 | 17  4.0 | 2 | —   | 17  5.2 |
| 3 | 7.9 | 18  6.7 | 3 | 4.8 | 18  5.0 | 3 | 5.9 | 18  4.7 |
| 4 | 7.3 | 19  6.6 | 4 | 6.0 | 19  5.0 | 4 | 8.0 | 19  5.9 |
| 5 | 5.0 | 20  6.9 | 5 | 5.2 | 20  5.5 | 5 | —   | 20  5.8 |
| 6 | 5.6 | 21  8.8 | 6 | 5.1 | 21  4.4 | 6 | 4.9 | 21  6.3 |
| 7 | 5.9 | 22  7.3 | 7 | 4.0 | 22  5.2 | 7 | 6.2 | 22  5.8 |
| 8 | 4.9 | 23  6.2 | 8 | 4.8 | 23  7.7 | 8 | —   |         |
| 9 | 6.3 | 24  8.0 | 9 | 7.5 | 24  6.5 | 9 | 4.8 |         |
| 10 | 5.8 |        | 10 | 5.1 | 25  3.5 | 10 | 5.4 |        |
| 11 | 6.7 |        | 11 | 4.4 | 26  4.0 | 11 | 5.5 |        |
| 12 | 5.5 |        | 12 | 4.8 | 27  5.0 | 12 | 6.2 |        |
| 13 | 7.7 |        | 13 | 4.2 | 28  4.3 | 13 | 6.4 |        |
| 14 | 6.9 |        | 14 | 7.0 | 29  4.0 | 14 | 5.4 |        |
| 15 | 6.4 |        | 15 | 5.9 | 30  7.1 | 15 | 5.5 |        |

EXAMPLE 1

Table 5 provides nematic range values measured and calculated from the data of Tables 1 to 4 and the Schroeder-Vanlaar equation when two types of compounds selected from the same group were combined. Since these combinations were relatively stable under heated and cooled conditions, they were kept at an ambient temperature of $-20°$ C. for three days until the crystal state was produced, and then with the ambient temperature raised, the temperatures at CN and NI points were measured.

TABLE 5
Composition and Nematic Range of Mixed Liquid Crystals (in the same group)

| No. | Types mixed | Mole % | Nematic range (calculated) | Nematic range (measured) |
|---|---|---|---|---|
| 1 | I - 5 | 60 | 30 ~ 142° C. | 28 ~ 142° C. |
|   | I - 10 | 40 | | |
| 2 | I - 13 | 30 | 20 ~ 139° C. | 20 ~ 139° C. |
|   | I - 18 | 70 | | |
| 3 | II - 13 | 50 | 0 ~ 98° C. | 0 ~ 98° C. |
|   | II - 7 | 50 | | |
| 4 | II - 14 | 40 | 30 ~ 97° C. | 28 ~ 97° C. |
|   | II - 19 | 60 | | |
| 5 | III - 11 | 50 | 40 ~ 128° C. | 40 ~ 128° C. |
|   | III - 14 | 50 | | |
| 6 | III - 7 | 50 | 25 ~ 136° C. | 23 ~ 136° C. |
|   | III - 10 | 50 | | |

These measured and calculated results show that the mixture made only in the same group does not provide a sufficient nematic range.

EXAMPLE 2

Table 6 shows nematic range values measured and calculated when a plurality of compounds selected from the different groups were mixed. The measured values for viscosity are also given in this data.

TABLE 6
Composition and Nematic Range of Mixed Liquid Crystals (in the different groups)

| No. | Types mixed | Mole % | Nematic range calculated | Nematic range measured | Viscosity cp 50° C. |
|---|---|---|---|---|---|
| 7 | I - 9 | 35 | 25 ~ 125° C. | 24 ~ 125° C. | 30 |
|   | II - 11 | 65 | | | |
| 8 | I - 12 | 50 | 22 ~ 119° C. | 22 ~ 120° C. | 35 |
|   | II - 15 | 50 | | | |
| 9 | I - 5 | 55 | 28 ~ 140° C. | 27 ~ 140° C. | 32 |
|   | III - 6 | 45 | | | |
| 10 | I - 5 | 40 | 10 ~ 120° C. | 9 ~ 120° C. | 30 |
|    | II - 13 | 60 | | | |
| 11 | II - 20 | 60 | 15 ~ 107° C. | 13 ~ 106° C. | 62 |
|    | III - 15 | 40 | | | |
| 12 | II - 7 | 50 | 0 ~ 112° C. | 0 ~ 111° C. | 35 |
|    | I - 5 | 20 | | | |
|    | I - 8 | 20 | | | |
|    | III - 9 | 10 | | | |

The measured and calculated results of Example 2 show that the mixture of compounds made between the different groups by selecting one compound from one group does not exhibit a sufficient nematic range. It has been found that the presence of a compound selected from group I causes the low viscosity of liquid crystal. It has also been found that the use of a plurality of group I compounds to lower the mole fraction of each compound gives a broader nematic range.

EXAMPLE 3

From the measured and calculated results of Examples 1 and 2, liquid crystal mixtures each having a low viscosity and a wide nematic range were assumed and an experiment was conducted for confirmation. The results are given in Table 7.

TABLE 7
Composition and Nematic Range of Mixed Liquid Crystals

| No. | Types mixed | Mole % | Nematic range calculated | Nematic range measured | Viscosity cP 50° C. |
|---|---|---|---|---|---|
| 13 | I - 5 | 10 | $-20 \sim 117°$ C. | CN < $-20°$ C. | 32 |
|    | I - 10 | 10 | | | |
|    | I - 18 | 10 | | | |
|    | II - 7 | 25 | | | |
|    | II - 13 | 25 | | | |
|    | III - 6 | 10 | | | |
|    | III - 14 | 10 | | | |
| 14 | II - 13 | 15 | $-30 \sim 99°$ C. | CN < $-20°$ C. | 65 |
|    | II - 9 | 15 | | NI = 100° C. | |
|    | II - 29 | 15 | | | |
|    | II - 7 | 20 | | | |
|    | II - 25 | 20 | | | |
|    | III - 6 | 5 | | | |
|    | III - 10 | 5 | | | |
|    | III - 14 | 5 | | | |
| 15 | II - 8 | 15 | $-30 \sim 124°$ C. | CN < $-20°$ C. | 30 |
|    | II - 13 | 15 | | NI = 124° C. | |
|    | II - 5 | 10 | | | |
|    | I - 5 | 10 | | | |
|    | I - 12 | 7.5 | | | |
|    | III - 6 | 7.5 | | | |
|    | I - 18 | 7.5 | | | |
|    | I - 10 | 7.5 | | | |
|    | I - 9 | 7.5 | | | |
|    | I - 23 | 7.5 | | | |

TABLE 7-continued
Composition and Nematic Range of Mixed Liquid Crystals

| No. | Types mixed | Mole % | Nematic range calculated | Nematic range measured | Viscosity cP 50° C. |
|---|---|---|---|---|---|
|  | III - 15 | 5 |  |  |  |
| 16 | II - 13 | 25 | −20 ~ 116.5° C. | CN< −20 C. | 30 |
|  | II - 20 | 25 |  | NI = 117° C. |  |
|  | I - 7 | 10 |  |  |  |
|  | I - 9 | 10 |  |  |  |
|  | I - 10 | 10 |  |  |  |
|  | I - 15 | 5 |  |  |  |
|  | I - 17 | 5 |  |  |  |
|  | I - 18 | 5 |  |  |  |
|  | I - 19 | 5 |  |  |  |
| 17 | I - 10 | 10 | −20° ~ 130.6° C. | CN< −20° C. | 32 |
|  | I - 15 | 70 |  | NI = 130° C. |  |
|  | I - 18 | 10 |  |  |  |
|  | I - 9 | 7.5 |  |  |  |
|  | I - 17 | 7.5 |  |  |  |
|  | I - 22 | 7.5 |  |  |  |
|  | III - 6 | 10 |  |  |  |
|  | III - 18 | 10 |  |  |  |
|  | III - 14 | 10 |  |  |  |
|  | III - 15 | 10 |  |  |  |
|  | III - 11 | 7.5 |  |  |  |

As will be seen from Table 7, each of CN points was below −20° C., though the measuring instrument used for the experiment did not read accurately because of its limited measurement range. Except for sample No. 14 which does not contain a group I compound, each viscosity is reduced to 30 to 32 cP or less at 50° C.

It has been observed that compounds selected from group I are necessary in amounts of 30 mole % or more of the total composition in order to obtain the low viscosity and that the preferred mole fraction of each compound is 10% or less to lower the CN point. At the same time, it has been found that each compound selected from group II or group III is up to 25 mole % for group II or 10 mole % for group III when mixed with group I compound. This assures the above broad nematic range along with the low viscosity.

As described above, this invention provides liquid crystal compositions each having a wide nematic range especially excellent in low-temperature properties, thus realizing liquid crystal display devices operable within a low temperature range of less than −20° C. (assumed −30° C.) at which conventional liquid crystal display devices have never been used.

I claim:

1. A liquid crystal composition comprising at least two compounds selected from the group I consisting of trans-4-alkylcyclohexane-1-carboxylic acid-4'-(4''-alkylphenyl)-2'-chlorophenyl ester having the general formula:

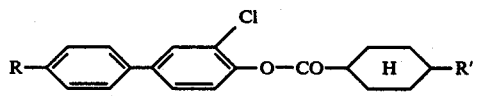

wherein R and R' are normal chain alkyl groups containing 2 to 7 carbon atoms, said at least two compounds making up 30 mole % or more of the total composition, and at least one compound selected from at least one of the group II consisting of 4-alkylbenzoic acid-4'-(4''-alkylphenyl)-2'-chlorophenyl ester having the general formula:

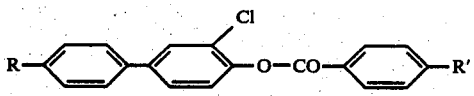

wherein R and R' are normal chain alkyl groups containing 2 to 8 carbon atoms and the group III consisting of 4-alkoxybenzoic acid-4'-(4''-alkylphenyl)-2'-chlorophenyl ester having the general formula:

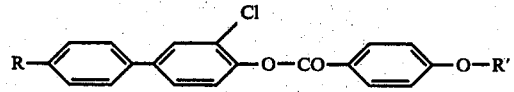

wherein R and R' are normal chain alkyl groups containing 2 to 8 carbon atoms.

2. The liquid crystal composition according to claim 1 wherein said at least two compounds selected from the group I comprise three or more compounds and each mole fraction of said three or more compounds is up to 10%.

3. The liquid crystal composition according to claim 2 wherein said at least one compound selected from at least one of the group II and the group III comprises a plurality of compounds selected from the group II, and each mole fraction of said plurality of compounds is up to 25%.

4. The liquid crystal composition according to claim 2 wherein at least one compound selected from at least one of the group II and the group III comprises a plurality of compounds selected from the group III, and each mole fraction of said plurality of compounds is up to 10%.

5. The liquid crystal composition according to claim 2 wherein at least one compound selected from at least one of the group II and the group III comprises a plurality of compounds selected from the group II and a plurality of compounds selected from the group III, each mole fraction of said plurality of compounds selected from the group II is up to 25%, and each mole fraction of said plurality of compounds selected from the group III is up to 10%.

6. The liquid crystal composition according to claim 3 consisting essentially of 10 mole % n-pentylcyclohexane-1-carboxylic acid-4'-(4''-n-butylphenyl)-2'-chlorophenyl ester, 10 mole % n-propylcyclohexane-1-carboxylic acid-4'-(4''-n-pentylphenyl)-2'-chlorophenyl ester, 10 mole % n-butylcyclohexane-1-carboxylic acid-4'-(4''-n-pentylphenyl)-2'-chlorophenyl ester, 5 mole % n-ethylcyclohexane-1-carboxylic acid-4'-(4''-n-hexylphenyl)-2'-chlorophenyl ester, 5 mole % n-butylcyclohexane-1-carboxylic acid-4'-(4''-n-hexylphenyl)-2'-chlorophenyl ester, 5 mole % n-pentylcyclohexane-1-carboxylic acid-4'-(4''-n-hexylphenyl)-2'-chlorophenyl ester and 5 mole % n-hexylcyclohexane-1-carboxylic acid-4'-(4''-n-hexylphenyl)-2'-chlorophenyl ester which are included in said group I, 25 mole % 4-pentylbenzoic acid-4'-(4''-pentylphenyl)-2'-chlorophenyl ester and 25 mole % 4-hexylbenzoic acid-4'-(4''-hexylphenyl)-2'-chlorophenyl ester which are included in said group II.

7. The liquid crystal composition according to claim 4 consisting essentially of 10 mole % n-butylcyclohexane-1-carboxylic acid-4'-(4''-n-pentylphenyl)-2'-chlorophenyl ester, 10 mole % n-ethylcyclohexane-1-carboxylic acid-4'-(4''-n-hexylphenyl)-2'-chlorophenyl ester, 10 mole % n-pentylcyclohexane-1-carboxylic acid-4'-(4''-n-hexylphenyl)-2'-chlorophenyl ester, 7.5 mole % n-propylcyclohexane-1-carboxylic acid-4'-(4''-n-pentylphenyl)-2'-chlorophenyl ester, 7.5 mole % n-butylcyclohexane-1-carboxylic acid-4'-(4''-n-hexylphenyl)-2'-chlorophenyl ester and 7.5 mole % n-butylcyclohexane-1-carboxylic acid-4'-(4''-n-heptylphenyl)-2'-chlorophenyl ester which are included in said group I, 10 mole % 4-butylalkoxybenzoic acid-4'-(4''-hexylphenyl)-2'-chlorophenyl ester, 10 mole % 4-pentylalkoxybenzoic acid-4'-(4''-heptylphenyl)-2'-chlorophenyl ester, 10 mole % 4-pentylalkoxybenzoic acid-4'-(4''-hexylphenyl)-2'-chlorophenyl ester, 10 mole % 4-hexylalkoxybenzoic acid-4'-(4''-hexylphenyl)-2'-chlorophenyl ester and 7.5 mole % 4-pentylalkoxybenzoic acid-4'-(4''-pentylphenyl)-2'-chlorophenyl ester which are included in said group III.

8. The liquid crystal composition according to claim 5 consisting essentially of 10 mole % n-propylcyclohexane-1-carboxylic acid-4'-(4''-butylphenyl)-2'-chlorophenyl ester, 10 mole % n-butylcyclohexane-1-carboxylic acid-4'-(4''-n-pentylphenyl)-2'-chlorophenyl ester and 10 mole % n-pentylcyclohexane-1-carboxylic acid-4'-(4''-n-hexylphenyl)-2'-chlorophenyl ester which are included in said group I, 25 mole % 4-butylbenzoic acid-4'-(4''-butylphenyl)-2'-chlorophenyl ester and 25 mole % 4-pentylbenzoic acid-4'-(4''-pentylphenyl)-2'-chlorophenyl ester which are included in said group II, and 10 mole % 4-butylalkoxybenzoic acid-4'-(4''-hexylphenyl)-2'-chlorophenyl ester and 10 mole % 4-pentylalkoxybenzoic acid-4'-(4''-hexylphenyl)-2'-chlorophenyl ester which are included in said group III.

9. The liquid crystal composition according to claim 5 consisting essentially of 10 mole % n-propylcyclohexane-1-carboxylic acid-4'-(4''-n-butylphenyl)-2'-chlorophenyl ester, 7.5 mole % n-hexylcyclohexane-1-carboxylic acid-4'-(4''-n-butylphenyl)-2'-chlorophenyl ester, 7.5 mole % n-pentylcyclohexane-1-carboxylic acid-4'-(4''-n-hexylphenyl)-2'-chlorophenyl ester, 7.5 mole % n-butylcyclohexane-1-carboxylic acid-4'-(4''-n-pentylphenyl)-2'-chlorophenyl ester, 7.5 mole % n-propylcyclohexane-1-carboxylic acid-4'-(4''-n-pentylphenyl)-2'-chlorophenyl ester and 7.5 mole % n-pentylcyclohexane-1-carboxylic acid-4'-(4''-n-heptylphenyl)-2'-chlorophenyl ester which are included in said group I, 15 mole % 4-pentylbenzoic acid-4'-(4''-butylphenyl)-2'-chlorophenyl ester, 15 mole % 4-pentylbenzoic acid-4'-(4''-pentylphenyl)-2'-chlorophenyl ester and 10 mole % 4-hexylbenzoic acid-4'-(4''-propylphenyl)-2'-chlorophenyl ester which are included in said group II, and 7.5 mole % 4-butylalkoxybenzoic acid-4'-(4''-hexylphenyl)-2'-chlorophenyl ester and 5 mole % 4-hexylalkoxybenzoic acid-4'-(4''-hexylphenyl)-2'-chlorophenyl ester which are included in said group III.

* * * * *